(12) United States Patent
Popov

(10) Patent No.: US 10,541,572 B2
(45) Date of Patent: Jan. 21, 2020

(54) STATOR FOR ELECTRIC MACHINE

(71) Applicant: ALMOTT OOD, Stara Zagora (BG)

(72) Inventor: Encho Nikolov Popov, Sofia (BG)

(73) Assignee: ALMOTT OOD, Stara Zagora (BG)

( * ) Notice: Subject to any disclaimer, the term of this patent is extended or adjusted under 35 U.S.C. 154(b) by 0 days.

(21) Appl. No.: 15/762,115

(22) PCT Filed: Oct. 6, 2016

(86) PCT No.: PCT/BG2016/000024
§ 371 (c)(1),
(2) Date: Mar. 22, 2018

(87) PCT Pub. No.: WO2017/059503
PCT Pub. Date: Apr. 13, 2017

(65) Prior Publication Data
US 2018/0269730 A1    Sep. 20, 2018

(30) Foreign Application Priority Data
Oct. 8, 2015 (BG) .......................... 112110

(51) Int. Cl.
H02K 3/12 (2006.01)
H02K 1/16 (2006.01)
H02K 3/34 (2006.01)

(52) U.S. Cl.
CPC ............... H02K 1/165 (2013.01); H02K 3/12 (2013.01); H02K 3/345 (2013.01)

(58) Field of Classification Search
CPC .. H02K 1/16; H02K 3/12; H02K 3/34; H02K 3/345; H02K 1/165; H02K 3/14
(Continued)

(56) References Cited

U.S. PATENT DOCUMENTS 5,086,245 A * 2/1992 Sieja ...................... H02K 1/165
310/187
2010/0019626 A1* 1/2010 Stout ......................... H02K 1/02
310/60 A (Continued)

FOREIGN PATENT DOCUMENTS

DE    102012212870 A1    1/2013
GB        189861 A      12/1922
JP       S5683254 A      7/1981

OTHER PUBLICATIONS

International Search Report for PCT/BG2016/000024 dated Jan. 11, 2017.

Primary Examiner — Naishadh N Desai
(74) Attorney, Agent, or Firm — Brown & Michaels, PC

(57) ABSTRACT

The stator is used for realization of drives and for generation electric energy in various fields of engineering. It provides reduction of basic and added electric losses in the stator winding at increased power. The stator includes a cylindrical stator pack (1) with a plurality of uniformly distributed slots (2) with an opening on the inner surface of the stator. In the slots (2) are laid double-layer winding composed of one or more than one double-arm sections (4) of wires having a rectangular cross-section, comprising an arm (5) adjacent to opening and an arm (6) to bottom of the slot (2), laid in two slots (2) distant from each other in step Y. The slot (2) is rectangular in one or two stages. The size (b1) in the radial direction of the cross-section of the wire, building at least one elementary double-arm section of the arm (5) near to an opening is at most equal to the size (b) in a radial direction of other wires in the slot (2).

1 Claim, 9 Drawing Sheets

(58) Field of Classification Search
USPC .................................. 310/214, 215, 179–210
See application file for complete search history.

(56) References Cited

U.S. PATENT DOCUMENTS

| | | | |
|---|---|---|---|
| 2010/0026132 A1* | 2/2010 | Ooiwa | H02K 3/12 310/201 |
| 2014/0042862 A1* | 2/2014 | Ishigami | H02K 3/12 310/187 |
| 2016/0218571 A1* | 7/2016 | Kusase | H02K 1/165 |

* cited by examiner

STATOR FOR ELECTRIC MACHINE

FIELD OF THE INVENTION

The present invention relates to a stator for an electric machine that is primarily intended to work as an alternator, motor generator, traction motor and generator for electric vehicles, electric motor for spindle drives and servo drives for machine tools with CNC, multipolar high-speed generator.

PRIOR ART

A stator for an electric machine is known [1] including a cylindrical stator pack with a plurality of electrically isolated slots with rectangular cross-section uniformly distributed on the inner surface wherein a winding is laid. The winding is made of a group of windings, each of which is built of double-arm sections connected in series. The arms of each double-arm section are situated in two different slots spaced from one another in step Y. The double-arm sections are formed as closed parallel sections realized by a plurality of wound wires. The double arm sections of the individual winding groups are arranged in a plurality of layers constituting a storeyed structure and the two arms of each closed parallel section are disposed in one layer of the storeyed structure of the winding. One arm of the double armed section of one layer is located closer to a slot opening and the other arm is closer to the bottom of the other slot of the same layer. The cross sectional area of the double armed sections located in one layer is different from the cross sectional area of the double armed sections located in another layer. The cross sectional area and the dimension of the cross sectional area in the radial direction of the arms of the double armed sections which are located in the outer peripheral layer are greater than the cross sectional area and the dimension of the cross sectional area in the radial direction of the arms of the double armed sections which are located in the inner peripheral layer. The number of turns of the wires forming the closed double armed sections for the different layers may be the same or different. The cross sectional area and the dimension of the cross sectional area in the radial direction of the wires of the double armed sections located in the different layers may be the same or different. A disadvantage of this known stator is the increased value of the added electrical losses that are generated by the increased circulating currents due to the parallel connection of the double armed section forming the individual layers of the winding. The wires in the two arms of the double armed sections act as elementary wires in the stator winding. Thus, in the circuits formed by the parallel connected wires of the double armed sections located in one slot, the cross leakage magnetic flux in the slots induces electromotive forces that generate circulating currents. Since the arms of the parallel double armed sections are arranged in two different slots, two circuits are formed, which are connected by means of the solders between the double armed sections in a common circulation circuit. When both arms of each of the parallel connected double armed sections are disposed in separate layers, the electromotive force in the common circuit is the sum of the electromotive forces in the composing circuits. The electromotive forces generating circulating currents in the two arms of the double armed sections are unidirectional and are summed. Thus, the magnitude of the electrical losses, which is proportionally dependent on the sum of the electromotive forces, is increased on the second degree.

Another disadvantage of the known stator is that the width of the circulating circuits formed by the two arms of the double armed sections is close to the height of the stator pack slot. The electromotive forces are proportional to the width of the commutation circuits encompassing the magnetic flux of leakage and the value of the added electrical losses from circulating currents is increased. This is due to the increased width of the circulating circuits, which has been increased additionally more than twice.

Another disadvantage of the known stator is that the differences in the cross sectional areas and their dimensions in the radial direction of the arms of the various double armed sections and the difference in the cross sectional areas and their dimensions in the radial direction of the wires in the double armed sections of the different layers does not lead to a reduction of the added losses from the eddy currents induced by the leakage across magnetic fluxes in the stator slots. The losses of eddy currents in the part of the wired which are located in the slots, induced by the leakage across magnetic flux are proportional to the dimensions in the radial direction of the cross sections of the wires of the fourth degree, to the number of the wires of the second degree and to the speed of rotation of the second degree. Therefore, the added losses from eddy currents may be reduced only if the dimensions in the radial direction of the individual wires composing the multiple turns are reduced, which is not a direct consequence and is not unambiguously correlated with the decrease in the cross sectional area of the wires.

SUMMARY OF THE INVENTION

The aim of the invention is to create a stator for an electric machine with a reduction in additional losses and increased power.

This object is aimed by a stator of an electrical machine including a cylindrical stator pack with a plurality of electrically isolated slots with rectangular cross section uniformly distributed on the cross section inner surface wherein a winding is laid made of serially connected double arm sections. Each arm of the double arm section is situated in two different slots spaced apart at a distance step Y. The one arm of the double arm section is located near to a slot opening and the other arm is located near to a bottom of the other slot. According to the invention the double arm sections are made of at least to parallel connected elementary sections from a single wire with a rectangular cross section enveloped tightly one over another and formed as hairpins split open or bifurcated. The distance to a slot opening of the one arm of each elementary section is the same as the distance to a slot bottom of the other arm. The size b1 in the radial direction of the wire cross section of the elementary double arm sections with arms located near to a slot opening and near to a slot bottom is less than the size in the radial direction of the wires cross section of the other elementary sections.

An advantage of the stator of an electric machine according to the invention is that through the so structured elementary double armed sections constituting the double armed section is a natural transposition of the wires of the parallel connected elementary double armed sections of the two slots in which the arms of the arms are located, is realized. The added electrical losses in the total circulation circuit of the two arms of the elementary double armed sections are proportional to the square of the summary quantity of the electromotive forces. As a consequence of the transposition, the electromotive forces induced in the circulation circuits exist in opposition and the circulation losses are reduced many times, and hence the added electrical losses for the whole electric machine are reduced.

Another advantage of the stator of an electric machine according to the invention is that the added electric losses from circulating circuits in the arms of the elementary double armed sections are further additionally reduced by a factor of two, due to the fact that the arms of the elementary double armed sections are compact because no wires of the other elementary double armed sections are inserted, Thus, the width of the communication circuits in them does not exceed half of the slot's height. By summing the effects of the above two advantages, the reduction in the value of added electric losses from circulating currents is reduced nearly 10 times.

Another advantage of the stator of an electric machine according to the invention is that the structure of the elementary double armed sections with the transposition of the wires of the one compact arm with respect to the wires of the other compact arm is combined with reduced dimensions in the radial direction of the cross sections of the wires, located near to a slot opening where the magnetic field leakage is most intense. In the wires near to an opening, the effect of reducing the losses of eddy currents by decreasing the radial dimensions is greatest. In this way, the losses of eddy currents in the slot parts of the wires are reduced and an opportunity has been provided for an increased number of parallel connected elementary sections in the double armed sections resulting in reduced eddy current losses without concomitant increase in the losses of circulating currents in the circuits of the parallel connected elementary double armed sections.

Thus, in the stator of an electrical machine according to the invention, a reduction of the eddy current losses in the slot parts is achieved, which is combined with the practical elimination of the added electric losses from circulating currents, resulting in increased power of the electric machine as a whole.

DETAILED DESCRIPTION OF PREFERRED EMBODIMENTS

Figure 1:
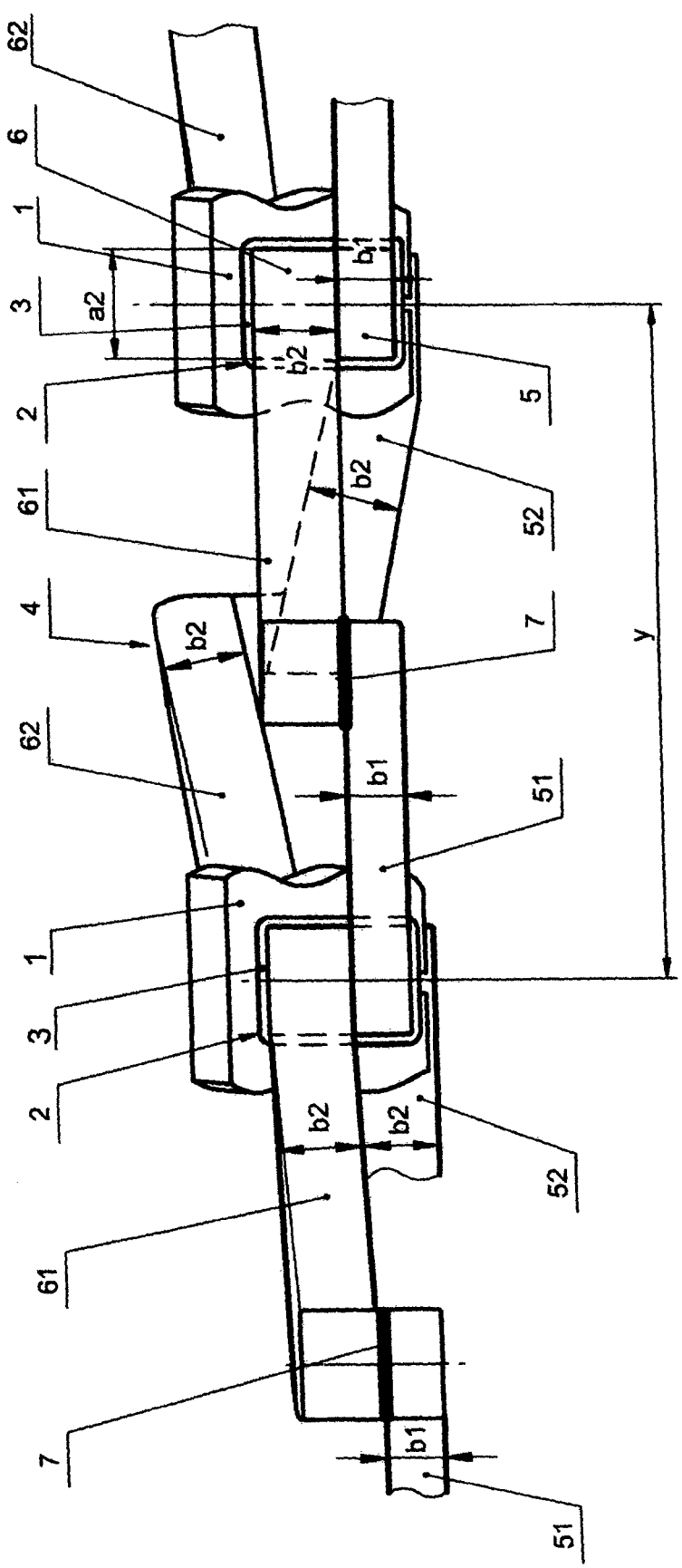
FIG. 1 is a perspective view from the side of the soldered joints of the double-arm sections made up of one elementary double-arm section, shaped like a hairpin split open, with two partial cutouts of the stator pack, each comprising a slot with a rectangular cross-section, distant in step Y, in each slot were laid one arm at the side by opening of one double-arm section and one arm to the bottom of the next double-arm section.
Figure 2:
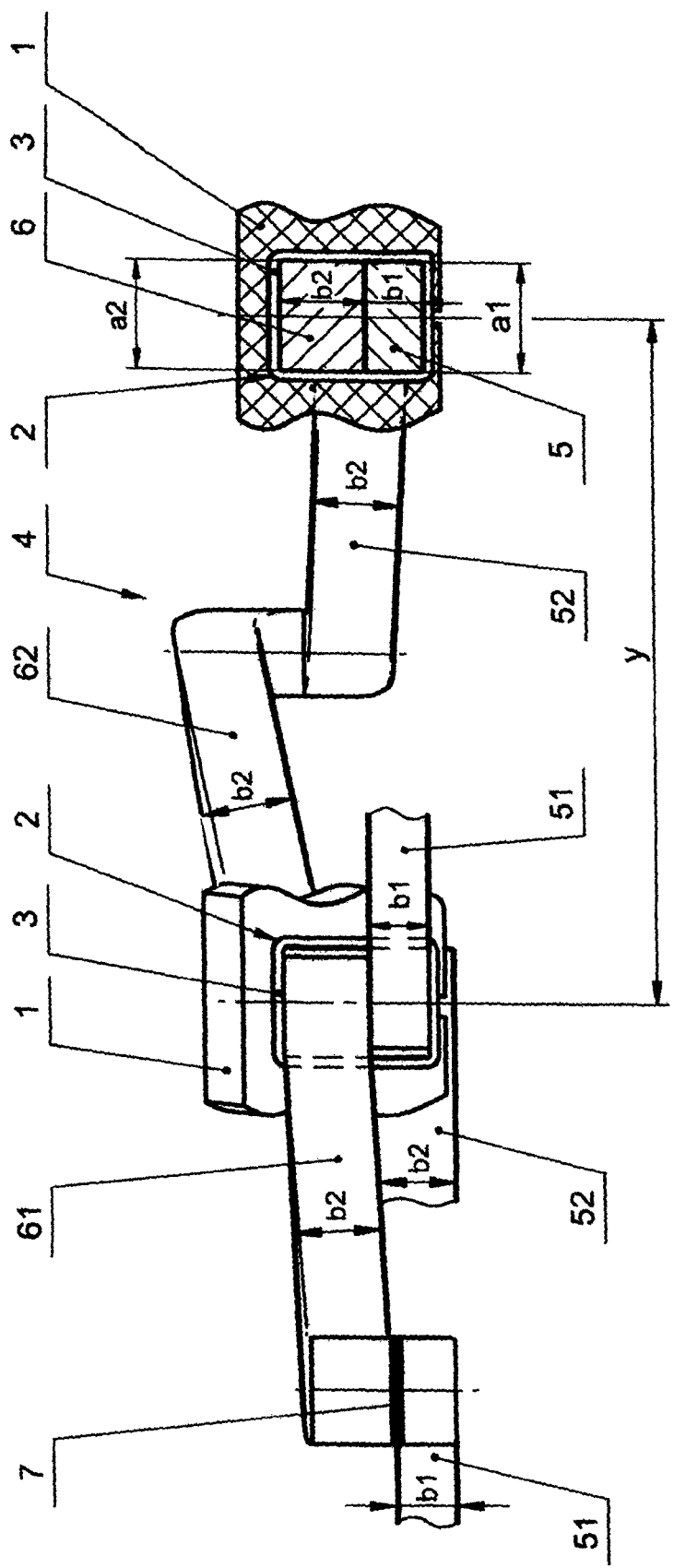
FIG. 2 is a view from the side of the soldered joints of the double-arm sections of the embodiment shown in FIG. 1, one cutout of the stator pack is shown as a cross-section through the cutout of the one slot with the wires laid therein.

In an preferred embodiment shown on FIG. 1 and FIG. 2 the stator for electric machine according to the invention is shown, comprising a cylindrical stator pack 1 made of electric sheets, on the inner surface of which is formed a plurality of uniformly distributed slots 2 with an opening and single rectangular cross-section. The slots 2 are covered with electric insulation 3. In each of the slots 2 is laid double-layer winding composed of double-arm sections 4. Each double-arm section 4 is composed of an elementary double-arm section, which is shaped as a hairpin split open from wire with a rectangular cross-section. The double-arm section 4 comprises an arm 5, adjacent to opening, and an arm 6 arranged to the bottom of the slot 2. The arm 5 adjacent to opening has a front end portion 51 and a rear end portion 52. The arm 6 positioned at the bottom of the slot 2 has a front end portion 61 and rear end portion 62. In the double-layer winding front end portions 51 and 61 of the double-arm sections 4 are soldered to one another by soldered joints 7. The arm 5 adjacent the opening of the slot, and the arm 6 positioned at the bottom of the slot of each elementary double-arm section 4 are laid in two slots 2, spaced apart at a distance step Y. The size a1 in the tangential direction of the wire cross-section of the arm 5 and the size a2 in the tangential direction of the wire cross-section of the arm 6 are equal. The size b1 in the radial direction of the wire cross-section in the slot part and the front part 51 of the arm 5, adjacent an opening, is less than the size b2 in the radial direction of the wire cross-section of the rear end parts 52 and 62, of the slot part of the rear arm 6 and of the front part 61. The same embodiment is shown in FIG. 3 and is characterized in that it shows three cutouts of the stator pack 1 around the slot 2, one cutout of the stator pack 1 is shown as a cross-section through the cutout of the one slot 2 with the wires laid therein.

Figure 3:
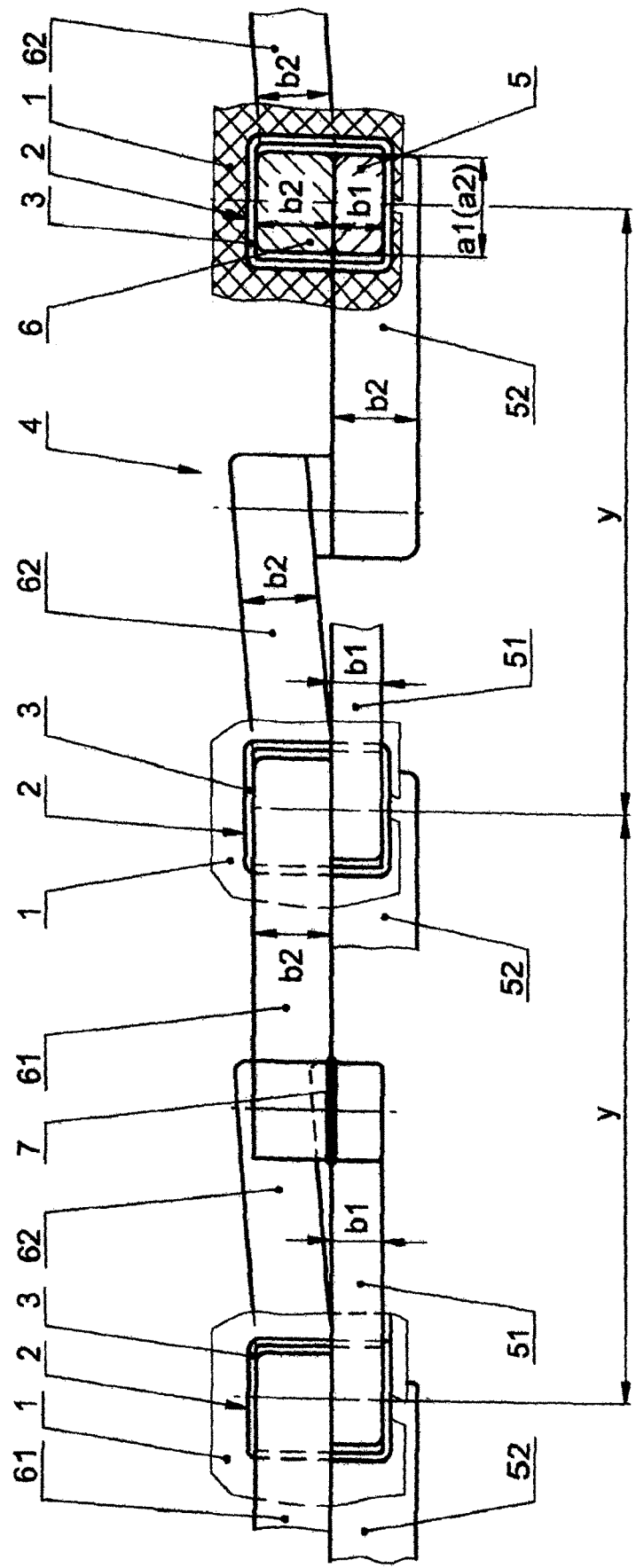
FIG. 3 is a view from the side of the soldered joints of the double-arm sections in the embodiment shown in FIGS. 1 and 2 with three partial cutouts of the stator pack, wherein the one cutout of the stator pack is shown as a cross-section through the one slot with the wires laid therein.
Figure 4:
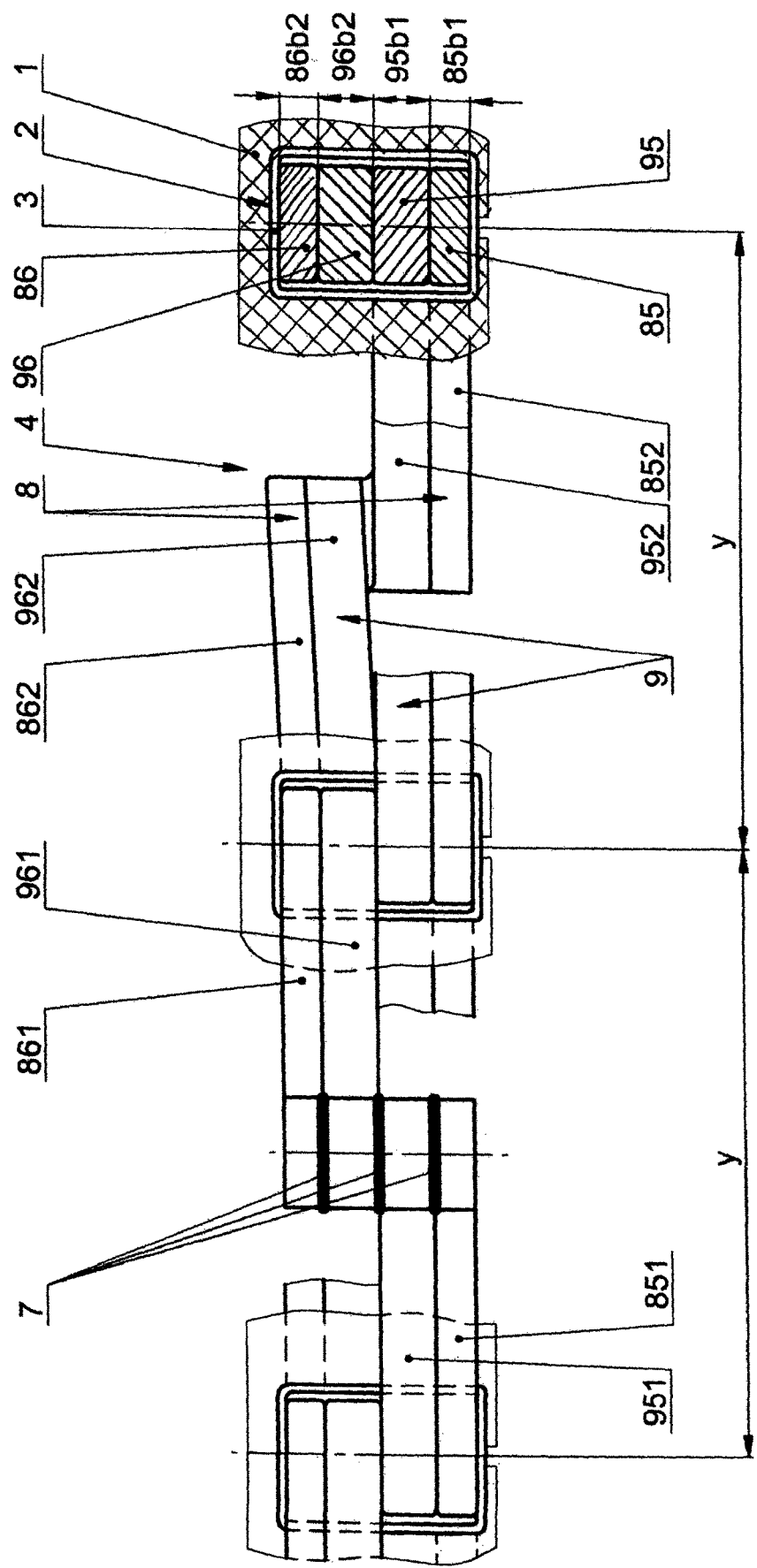
FIG. 4 is a view from the side of the soldered joints of the double-arm sections made up of more than one elementary section, formed as hairpins split open, with three partial cutouts of the stator pack, one cutout of the stator pack is shown as a cross-section through the cutout of the one slot with the wires laid therein.

The further exemplary embodiment shown in FIG. 4 differs from the embodiment shown in FIGS. 1, 2 and 3 in that the double-arm section 4 is comprised of more than one elementary double-arm sections: enveloping 8 and enveloped 9 formed as hairpins split open. The dimensions 85$b$1 and 86$b$2 in the radial direction of the cross-section of the arms wires of the enveloping elementary section 8 comprising the arm 85 adjacent an opening are smaller than the dimensions 96$b$ 1 and 96$b$2 in the radial direction of the cross-section of the arms wires 95 and 96 of enveloped elementary section 9. The dimensions in the radial direction of the cross-section of the wires of the enveloping 8 and enveloped 9 sections are equal in all their parts to the dimensions in the radial direction of the cross-section of wires in their slot parts. In the double-layer winding double-arm sections 4 are soldered to one another by soldered joints 7.

Figure 5:
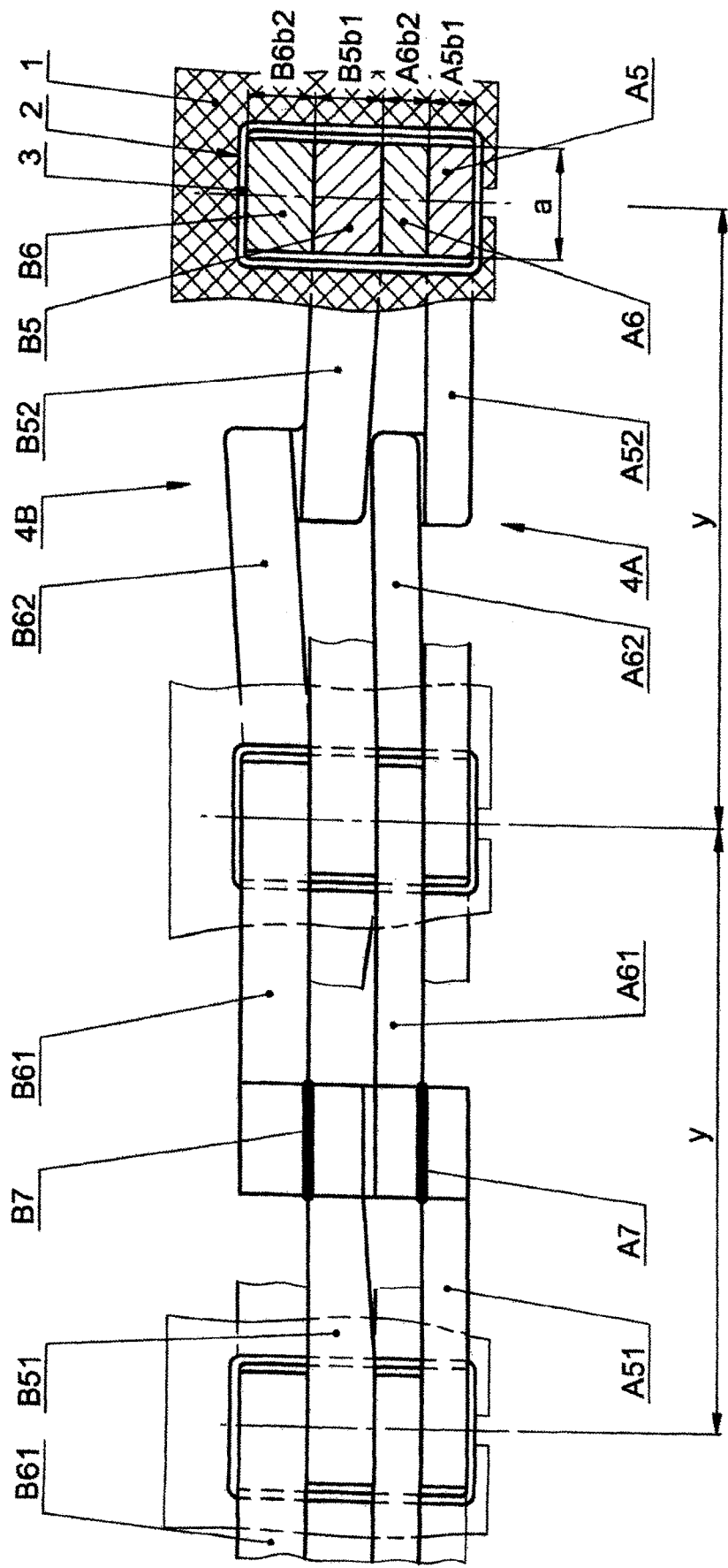
FIG. 5 is a view from the side of the soldered joints of two windings from double-arm sections arranged one over the other, shaped like hairpins split open, with three partial cutouts of the stator pack, one cutout of the stator pack is shown as a cross-section through the cutout of the one slot with the wires laid therein.

In the next preferred embodiment shown in FIG. 5 are shown double-arm sections 4A and 4B, realized as bifurcations or as hairpins split open, forming windings arranged one above the other. The dimensions in the radial direction A5$b$1 and A6$b$2 of the cross-sections of the wires composing the lying to the opening of the slot double-arm sections 4A are equal to each other and are smaller than the dimensions in the radial direction V5$b$1 and V6$b$2 of the cross-sections of the wires composing the lying to slot bottom double-arm sections 4B. The dimensions in the radial direction of the cross-section of the wires of the double-arm windings 4A and 4B in all their parts are equal to the dimensions in the radial direction of the cross-section of the wires in their slot parts. The double-arm sections 4A are joined in a winding by soldered joints A7. Double-arm sections 4B are joined in a winding by soldered joints B7. There is no difference among the dimensions of cross-sections of the wires in different parts of sections A. Also there is no difference among the dimensions of cross-sections of the wires in different parts of sections B.

Figure 6:
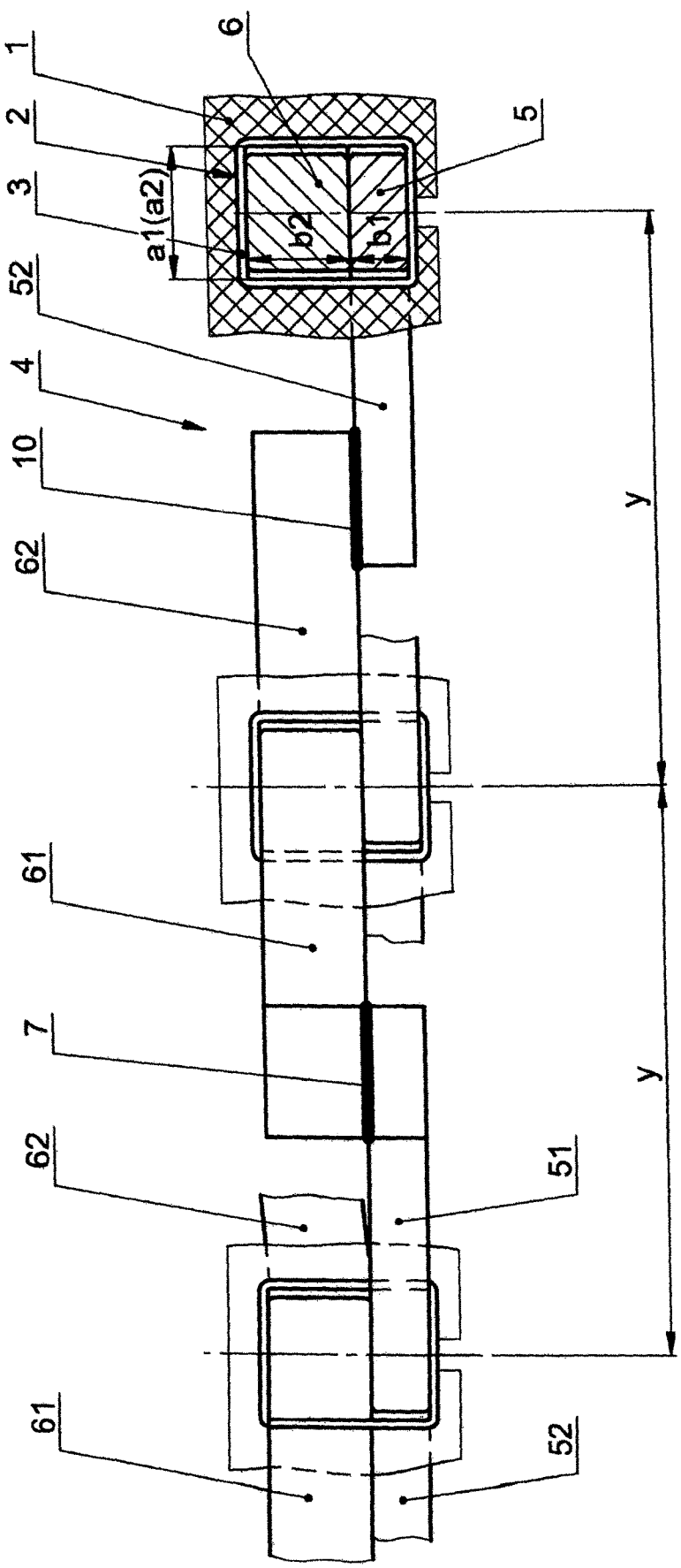
FIG. 6 is a view from the side of the soldered joints of the double-arm sections made up of one elementary double-arm section, formed by soldered joint, with three partial cutouts of the stator pack, one cutout of the stator pack is shown as a cross-section through the cutout of the one slot with the wires laid therein.

The next embodiment shown in FIG. 6, differs from the embodiment shown in FIGS. 1, 2 and 3 in that the double-arm section 4 is formed by soldered joints 10 of the rear part 52 of the arm 5, situated next to the slot opening, and the rear part 62 of the arm 6 positioned at the slot bottom and in that the dimensions of the wire cross-section of the arm 5 in all its parts are identical with each other, and the dimensions of the wire cross-section of the arm 6 in all its parts are identical with each other. The size b1 in the radial direction of the wire cross-section of the arm 5 is less than the size b2 in the radial direction of the wire cross-section of the arm 6. In the double-layer winding front end parts 51 and 61 of the double-arm sections 4 are soldered by soldered joints 7.

Figure 7:
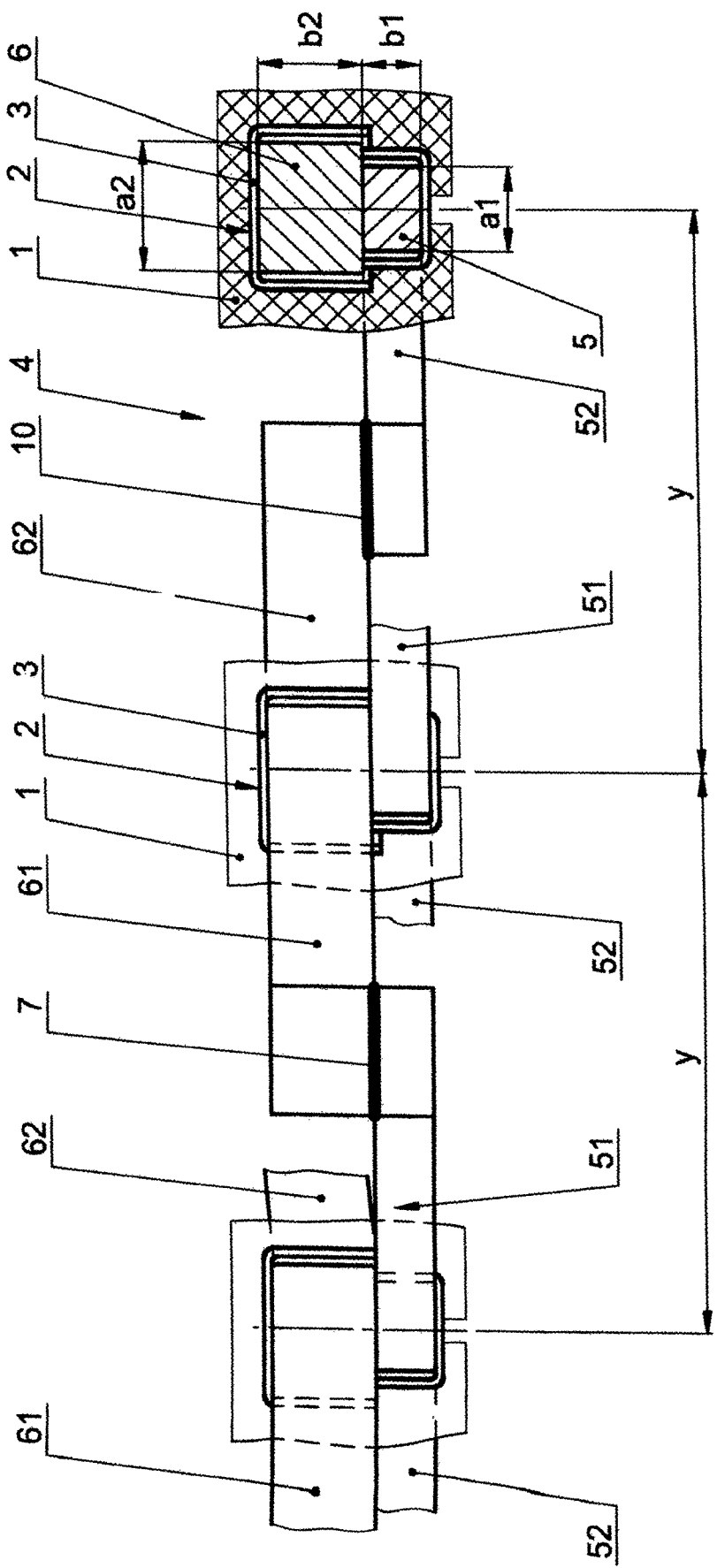
FIG. 7 is a view from the side of the soldered joints of the double-arm sections made up of an elementary double-arm section each, formed by soldered joint, with three partial cutouts of the stator pack, one cutout of the stator pack is shown as a cross-section through the cutout of the one slot with the wires laid therein.

In FIG. 7 is shown a further embodiment of the invention, which differs from the embodiment shown in FIG. 6 in that the cross-section of the slot 2 is a two-stage rectangular section, formed of two rectangular parts with different widths which are connected to one another and are arranged one above the other. The opening of the slot 2 is located in the part with a smaller width. In the slots 2 is laid a double-layer winding built of soldered double-arm sections 4. The rear part 52 of the arm 5 and 62 of the arm 6 are soldered to one another by soldered joints 10. The arm 6 has a greater width a2 of the cross-section of the wire and situated in the part of the slot 2 with a greater width to slot bottom. The arm 5 adjacent the opening has a smaller width a1 of the wire cross-section and is placed in a part with a smaller width to the opening of the slot 2. Size b1 in the radial direction of the wire cross-section of the arm 5, situated to slot opening is smaller than the size b2 in the radial direction of the wire cross-section of the arm 6 to slot bottom. The dimensions of the cross-sections of the parts of the arm 5 are equal to each other. The dimensions of the cross-sections of the parts of the arm 6 are equal to each other. The arms of the double-arm sections 4 are spaced apart at a distance step Y. Double-arm sections 4 were joined in a winding through soldered joints 7 between their front end parts.

Figure 8:
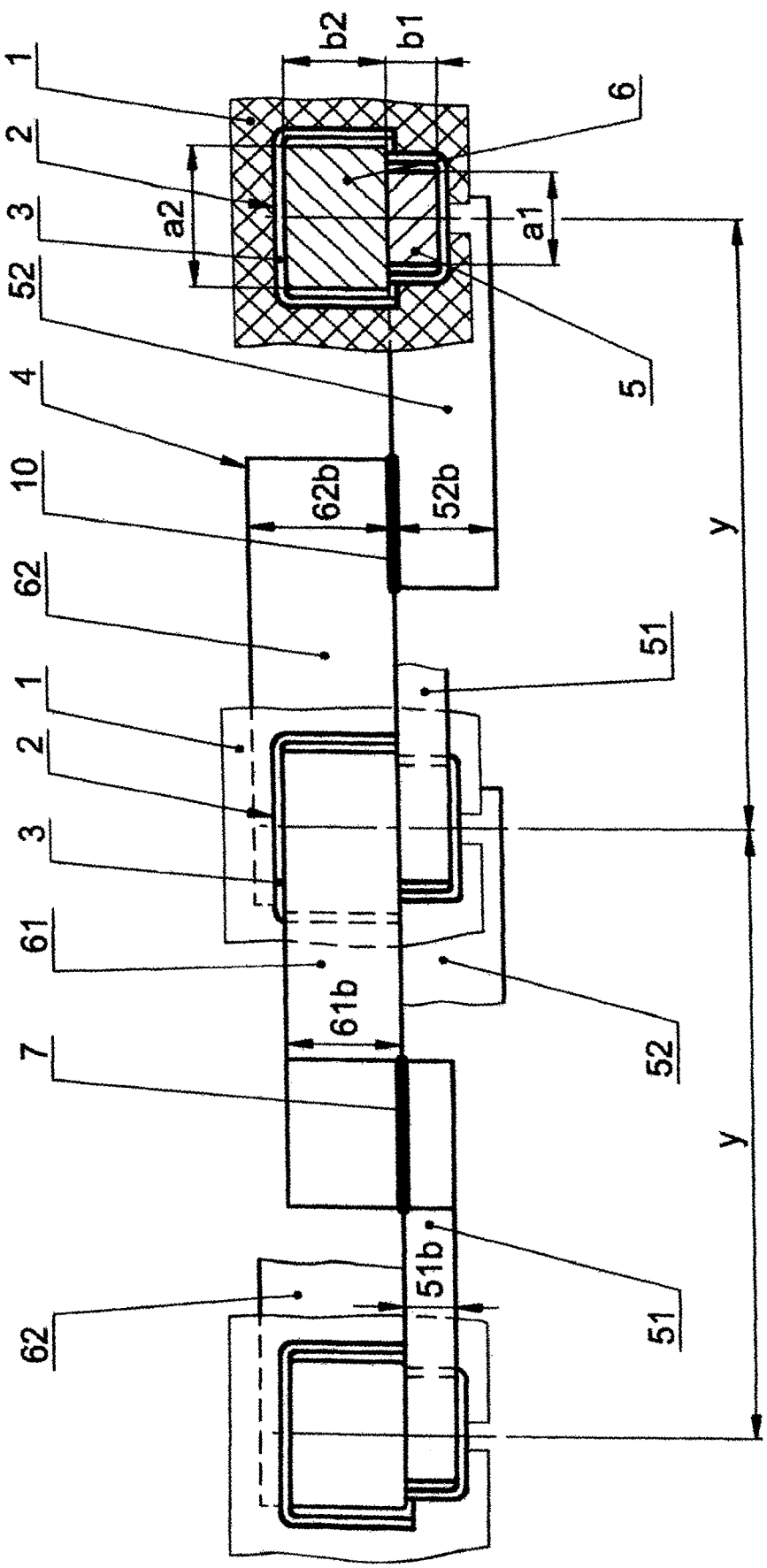
FIG. 8 is a view from the side of the soldered joints of the double-arm sections made up of an elementary double-arm section each, formed by soldering, with three partial cutouts of the stator, one cutout of the stator pack is shown as a cross-section through the cutout of the one slot with the wires laid therein.

The further exemplary embodiment shown in FIG. 8, differs from the embodiment shown in FIG. 7, in that the size 52$b$ in the radial direction of the wire cross-section of the rear end part 52 of arm 5 is greater than the size of arm 5 in the radial direction of the cross-section of the wires of its slot part b1 and its front end part 51$b$. Also, the size 62$b$ in the radial direction of the wire cross-section of the rear end part 62 of the arm 6 is greater than the dimensions of its slot part b2$i$ and of its front end part 61$b$.

Figure 9:
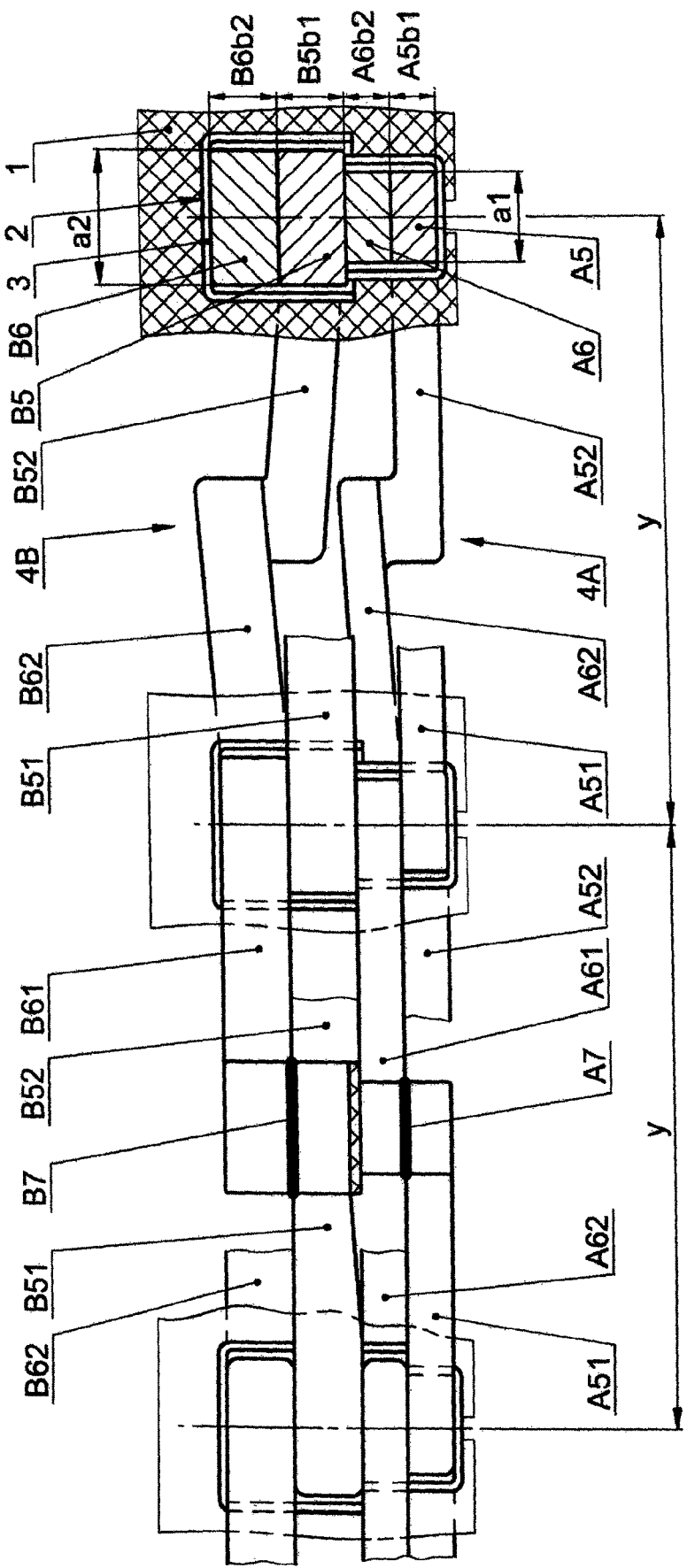
FIG. 9 is a view from the side of the soldered joints of two windings from double-arm sections arranged one above the other, shaped like hairpins split open, with three partial cutouts of the stator pack, one cutout of the stator pack is shown as a cross-section through the cutout of the one slot with the wires laid therein.

The next exemplary embodiment shown in FIG. 9, is analogous to the embodiment shown in FIG. 5, and differs from it in that the rectangular cross-section of the slots 2 is two-stage and is formed of two rectangular parts of different widths, joined to one another and arranged one above another, the narrower parts of the slots 2 are next to the openings. The size a2 in the tangential direction of the cross-section of the wires of the arms of the sections 4B is larger than the size a1 in the tangential direction of the wires cross-section of the arms of the sections 4A. The dimensions A5$b$1 and A6$b$2 in the radial direction of the cross-section of the arms of the sections 4A are equal to each other and are smaller than the dimensions B5$b$1 and B6$b$2 in a radial direction of the wires cross-section of the arms of the sections 4B, which are also equal to each other. Sections 4A are joined in a winding by soldered joints A7. Sections 4B are joined in a winding by soldered joints B7.

Use of the Invention

The stator for electric machine according to the invention is used mounted in the electric machine comprising a rotor mounted on a shaft. The drive shaft is sustained by bearings in front and rear end bells. By current flowing in the stator winding, the magnetic field created by this current, reacts with an existing or created magnetic field of the rotor, with the result that torque arises. By the reduction of size b in the radial direction of the cross-section of the one or more wires arranged to the openings of the slots 2 are reduced also the generated added electric losses by leakage alternating magnetic field in the slots 2, running through the wires, which is most intensive in the area near to the openings of the slots 2. At the same time, the increase in basic electric losses due to increased active resistance of the wires with reduced dimensions b1 of their cross-sections is offset by reduced active resistance of the other wires in the slots 2 due to the larger dimensions b2 in the radial direction of their cross-sections. As a result, the value of the added electric losses is reduced. The value of basic electric losses in the winding as a whole is maintained or reduced. As a result of application of the invention, the total electric losses are reduced and the power of the electric machine is increased.

Experimental Results Received During Experimentation of the Invention

According to the invention was developed a version of an existing virtual competitive model of an existing stator of electric machine with the following characteristic data: number of wires in the slot 2, dimensions of the cross-section of the wires 2.5×4.5 mm., number of slots 72 and number of poles 12, length of the stator pack 55 mm. The comparison is made for speed 6000 RPM.

The virtual sample according to developed version has stator pack fully equal in size to the stator pack of the existing model. The dimensions of the cross-sections of the wires in the virtual sample are modified as follows: dimensions of the cross-section of the wires to the slot opening: 2.5×3.5 mm, dimensions of the cross-section of the wires to the slot bottom: 2.5×5.5 mm. The amount of basic and added electric losses of the virtual sample is reduced by 25% compared to the amount of basic and added electric losses of the existing model.

REFERENCE

1. US 2014/0042862A1

The invention claimed is:
1. A stator for an electrical machine comprising:
a cylindrical stator pack including:
 a plurality of electrically isolated slots uniformly distributed along on an inner surface of the stator;
 a rectangular cross section on the inner surface of the electrically isolated slots of the stator; and
 a winding including double arm sections connected in series, the double arm sections each including an individual arm situated in two different slots of the stator spaced apart by a distance Y, wherein:
 a first arm of the double arm sections is proximate to an opening of a slot and a second arm of the double arm section is located near a bottom of another slot;
 the double arm sections comprise at least two parallel connected elementary sections of a single wire wrapped tightly around the single wire over a rectangular cross section and forms as a hairpin split open;
 a distance to the opening of the slot of the first arm of each elementary section is equivalent to the distance of a bottom of the slot opening of a corresponding arm; and
 a radial dimension of the single wire in the cross section of the elementary section, with arms proximate to the opening of the slot and the bottom of the slot, is smaller than the radial dimension of a wire cross section of another elementary section.

* * * * *